Oct. 17, 1961 D. W. McAFEE, JR 3,004,653
APPARATUS FOR BUTT-WELDING TUBE
Filed March 20, 1958 2 Sheets-Sheet 1

INVENTOR
DANIEL W. McAFEE Jr.
By Donald G. Dalton
Attorney

Oct. 17, 1961     D. W. McAFEE, JR     3,004,653
APPARATUS FOR BUTT-WELDING TUBE
Filed March 20, 1958     2 Sheets-Sheet 2
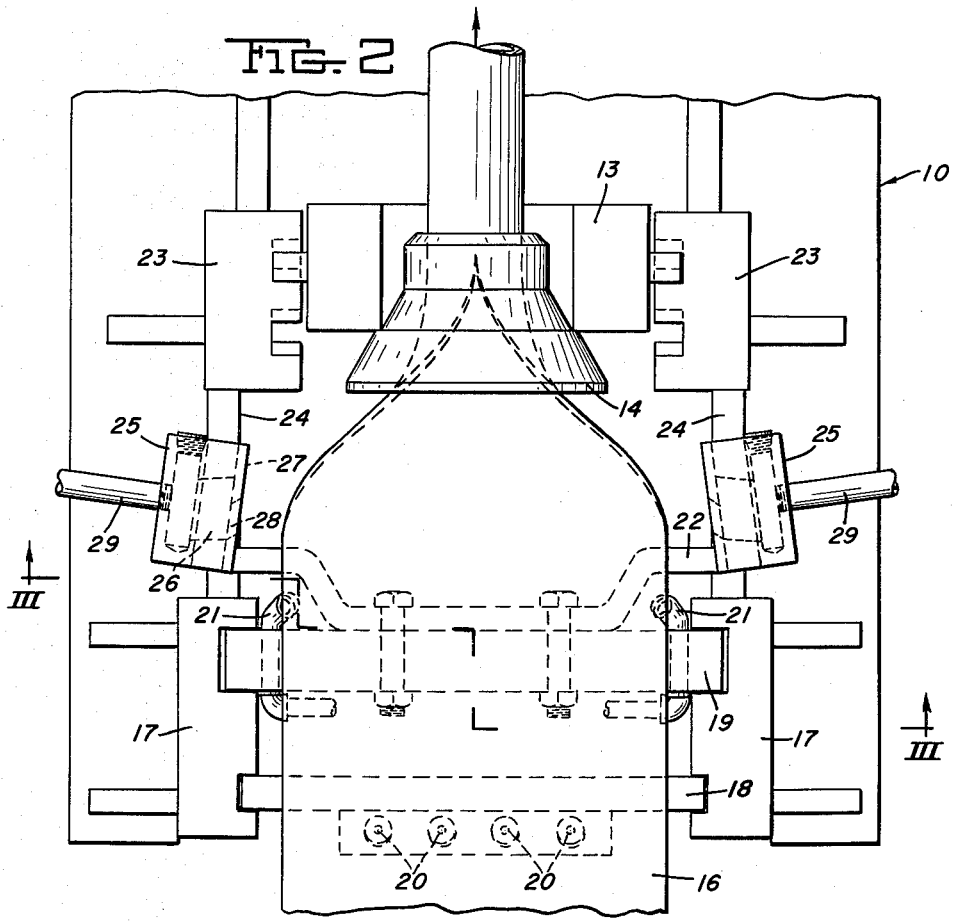
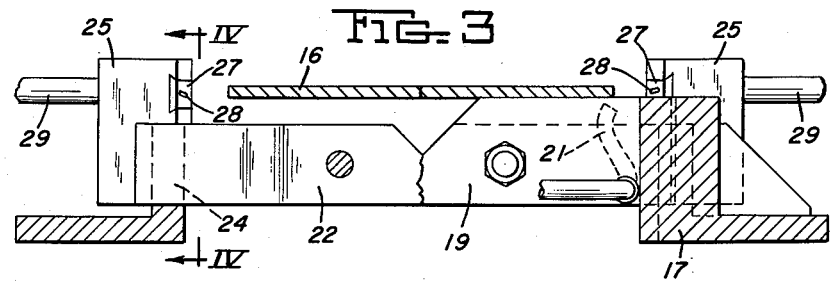
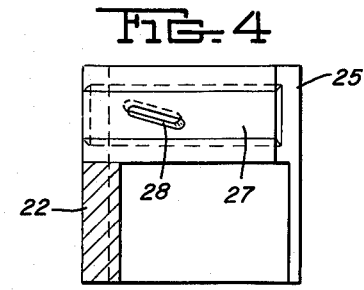
INVENTOR
DANIEL W. McAFEE Jr.
By Donald G. Dalton
Attorney

United States Patent Office 3,004,653
Patented Oct. 17, 1961

3,004,653
APPARATUS FOR BUTT-WELDING TUBE
Daniel W. McAfee, Jr., Lorain, Ohio, assignor to United States Steel Corporation, a corporation of New Jersey
Filed Mar. 20, 1958, Ser. No. 722,751
3 Claims. (Cl. 205—9)

This invention relates to the manufacture of pipe or tube by the butt-weld method and, in particular, to nozzles for discharging jets of oxygen onto the edges of the heated skelp as it is drawn from the welding furnace toward the welding bell.

It is customary in making butt-weld pipe to apply an oxygen jet to each edge of the skelp after it has been heated in the welding furnace, to cause further heating of the edges by oxidation, preparatory to welding thereof on being drawn through the conventional welding bell. My invention concerns improved nozzles for discharging such jets. The object of the invention is to utilize the oxygen with greater efficiency by increasing the length of the zone of contact thereof with the edge portions moving progressively past the jets, so as to obtain the maximum benefit of the oxygen consumed. A further object is to prevent clogging of the orifice of one nozzle by cinder blown from the skelp by the other nozzle. This, I accomplish by directing the opposed jets at proper angles. I also employ water jets directed outwardly from the path of the skelp ahead of the oxygen jets, to prevent accumulation of cinder which might cause clogging.

A complete understanding of the invention may be obtained from the following detailed description and explanation which refer to the accompanying drawings illustrating the present preferred embodiment. In the drawings:

FIGURE 2 is a portion of FIGURE 1 to enlarged scale;

FIGURE 3 is a transverse section taken along the plane of line III—III of FIGURE 2;

FIGURE 4 is a partial section taken along the plane of line IV—IV of FIGURE 3 showing one of my improved nozzles in elevation;

Figure 1:
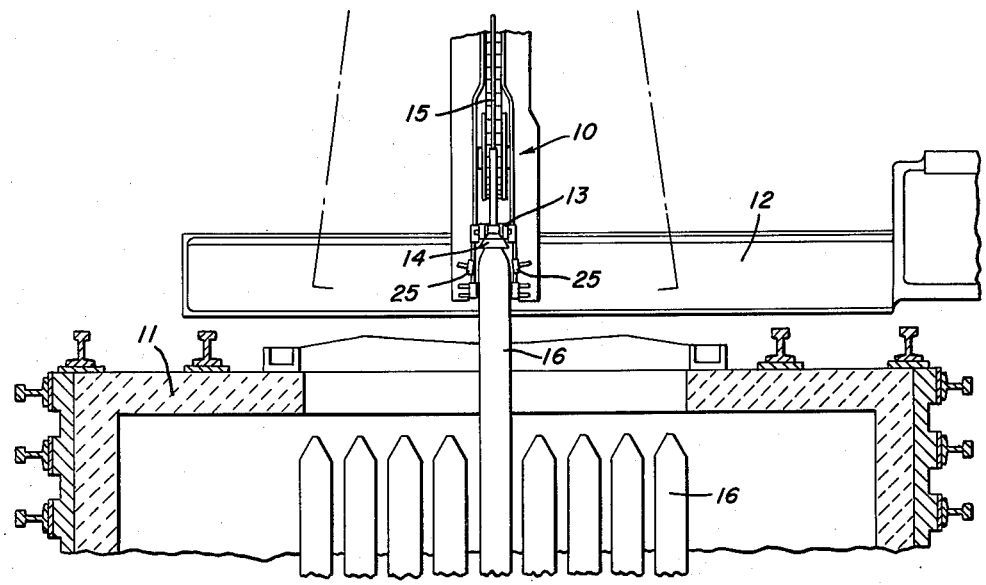
FIGURE 1 is a partial horizontal section through the drawing end of a welding furnace, showing the adjacent end of the welding machine or draw-bench associated therewith in plan.
Figure 5:
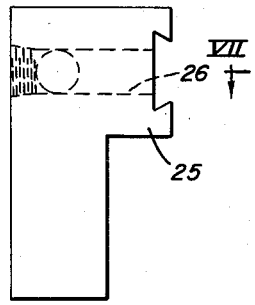
FIGURES 5, 6 and 7 are an end elevation, side elevation and cross-section, respectively, of the block forming each nozzle.
Figure 6:
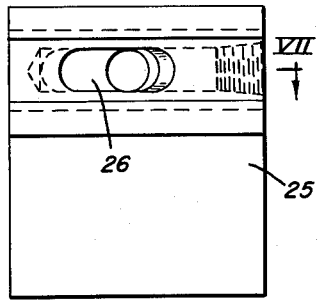
Figure 8:
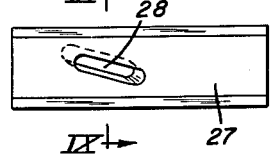
FIGURES 8 and 9 are an elevation and a cross-section of an orifice plate for the nozzle block.

Referring now in detail to the drawings and, for the present, to FIGURE 1 particularly, a welding machine or draw bench 10 is located generally in line with a reheating or welding furnace, the drawing end of which is shown at 11. The draw bench is pivoted at the end thereof remote from the furnace for swinging in a horizontal plane between extreme positions indicated by chain lines. The furnace end of the bench, during such movement, rides on a transverse rail 12. Adjacent the furnace end of the machine is a bell stop 13 adapted to arrest a welding bell 14 through which gripping tongs 15 and a heated length of skelp 16 seized thereby may be inserted to be drawn by the traveling chain of bench 10. All the apparatus described so far is conventional, forms no part of my invention and is included only to provide adequate background for an understanding of the latter.

Referring now to FIGURES 2 and 3, the furnace end of the bench 10 has spaced seating blocks 17 thereon accommodating the ends of transverse bars 18 and 19. Bar 18 supports a plurality of nozzles 20 adapted to discharge air jets from any suitable source onto the lower side of the skelp, which becomes the inside of the tube, to remove therefrom scale formed during the heating in furnace 11. Bar 19 supports nozzles 21 which discharge jets of water from any convenient source, outwardly from the path of the skelp. Bar 19 also carries a positioning yoke 22 extending across below the skelp path, the function of which will appear shortly. Blocks 23 on the welding machine spaced inwardly from the end thereof removably support the bell stop 13.

Side bars 24 extend between blocks 17 and 23 parallel to the skelp path and on either side thereof. A nozzle block 25 is secured to each side bar at an angle, in the horizontal plane, of about 7° to the axis of bell 14. Each block has a cavity 26 opening onto the inner side thereof. The mouth of the cavity is closed by an orifice plate 27 having a slot 28 therein which is in register with the cavity. The inner face of the block 25 has a dove-tailed groove which slidably receives the beveled edges of the plate (see FIGURES 5–8). As shown, the orifice plate is of substantial thickness so the angular orientation of the slot 28 exerts effective directional control on the jet issuing therefrom. Supply pipes 29 screwed into the outer faces of blocks 25 are connected to any suitable source of oxygen or air enriched with oxygen.

Figure 9:
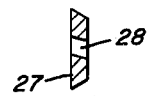
Figure 7:
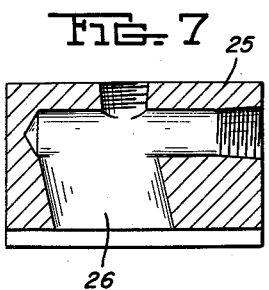

As is evident from FIGURES 3 and 4, slot 28 is inclined longitudinally downwardly in the direction of skelp travel, at an angle of about 15°. The width of the slot is similarly inclined downwardly at about the same angle, as shown in FIGURE 9. This imparts a downward velocity component to the jets directed onto the skelp edges, transversely thereof. FIGURE 2 shows the ends of the slot inclined at an angle of about 45° to the plates 27. The latter are inserted in blocks 25 so that this gives the jets a velocity component in the direction of skelp travel. It will be noted that the blocks 25 have their ends nearer the furnace, in engagement with the ends of yoke 22 whereby the latter aids in positioning them.

By virtue of the construction described above, the skelp being drawn through the bell 14 is subjected to air jets on the bottom face inwardly of the edges, from nozzles 20. The outwardly directed water jets from nozzles 21 keep the area adjacent to the skelp 16, blocks 17, and blocks 25 from accumulating cinder which would tend to clog the area and the orifices in plate 27. Finally the edges of the skelp are subjected to oxygen jets directed downwardly thereon in the transverse direction and inclined longitudinally in the direction of travel, from nozzle blocks 25. The overall effect of blocks 25 is to direct jets of air or oxygen slightly downward and at an angle toward the welding bell thus affording prolonged contact of the oxygen with the heated skelp edges as they approach the bell and are bent downwardly thereby. The forward velocity component imparted to the jets prevents cinder from being blown by one jet onto the opposite nozzle and thereby avoids clogging which would otherwise result.

My invention achieves important advantages in that, while the structure involved is simple and relatively inexpensive, it materially improves the efficiency in the use of oxygen which is a cost factor and reduces the maintenance necessary which is reflected in less production loss occasioned by shut-downs.

Although I have disclosed herein the preferred embodiment of my invention, I intend to cover as well any change of modification therein which may be made without departing from the spirit and scope of the invention.

I claim:

1. In apparatus for making butt-weld tube including a welding bell, a bell stop and means for drawing skelp through the bell, the combination therewith of spaced opposed blocks mounted on the entry side of the bell substantially at the level of the path of the edges of the skelp as it is drawn through the bell, each block having a cavity therein opening thereinto from the side of the block adjacent the skelp path, a pipe connection from each block to a source of oxidizing gas and a removable orifice plate overlying said cavity, said plate having a slot therein extending generally along said path, in register with said cavity, the slot being longitudinally inclined downwardly in the direction of skelp travel.

2. Apparatus as defined in claim 1, characterized by said slot being transversely inclined downwardly toward the skelp path.

3. Apparatus as defined in claim 1, characterized by the ends of said slot being at an oblique angle to said plate thereby imparting to the jet discharged thereby a velocity component in the direction of skelp travel.

References Cited in the file of this patent
UNITED STATES PATENTS

| | | |
|---|---|---|
| 1,848,671 | Sievern | Mar. 8, 1932 |
| 2,054,954 | Sievern | Sept. 22, 1936 |
| 2,581,673 | Kennedy | Jan. 8, 1952 |
| 2,646,267 | Kuntz | July 21, 1953 |